Dec. 10, 1963  M. L. BENJAMIN  3,113,474
INDEXING DEVICE

Filed Nov. 7, 1960

INVENTOR.
MILTON L. BENJAMIN
BY
Oberlin, Maky & Donnelly
ATTORNEYS

INVENTOR.
MILTON L. BENJAMIN
BY Oberlin, Maky & Donnelly
ATTORNEYS

United States Patent Office 3,113,474
Patented Dec. 10, 1963

3,113,474
INDEXING DEVICE
Milton L. Benjamin, Shaker Heights, Ohio, assignor to Erickson Tool Company, Solon, Ohio, a corporation of Ohio
Filed Nov. 7, 1960, Ser. No. 67,740
4 Claims. (Cl. 74—817)

The present invention relates generally as indicated to an indexing device and more particularly to improvements in an indexing device of the type disclosed in the Milton L. Benjamin et al. Pat. No. 2,793,866, dated May 28, 1957, by which the chuck adapted to be mounted thereon may be accurately indexed for performing machining operations such as drilling or slotting of a workpiece held by the chuck at selected angular intervals.

It is a primary object of this invention to provide such an indexing device by which accurate rotary indexing in small angular increments may be effected and with which the accuracy of indexing may be maintained indefinitely even though parts of the indexing device may progressively wear.

It is another object of this invention to provide an indexing device which is so constructed that the components thereof which have anything at all to do with the indexing function, either are adjustable, or are rendered self-adjusting, so as to eliminate radial and angular play with respect to the axis about which the spindle of the indexing device is adapted to be rotatably indexed.

It is another object of this invention to provide an indexing device that has an adjustable ratchet mechanism to advance an index plate having a great number of teeth in small angular steps to align the interdental spaces thereof with the correspondingly narrow end of a spring actuated indexing pin that locks the index plate in successive indexed positions pending the setting of a brake provided on the spindle of the indexing device.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

Figure 6:
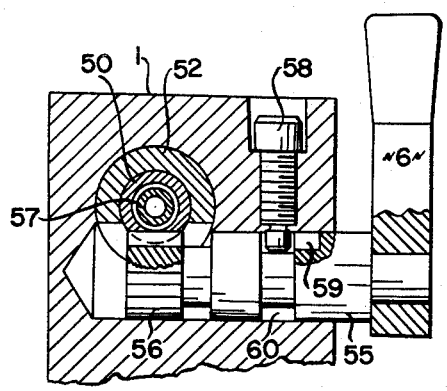
Figure 3:
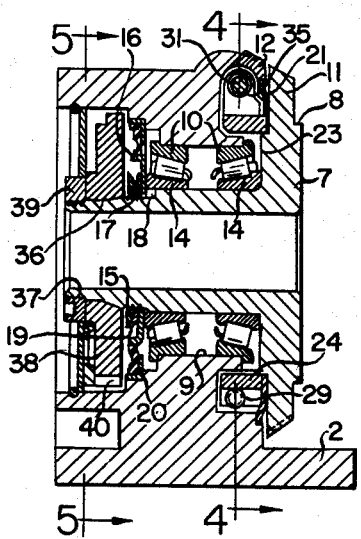
FIG. 3 is a vertical cross-section view taken substantially along the line 3—3, FIG. 1.
Figure 4:
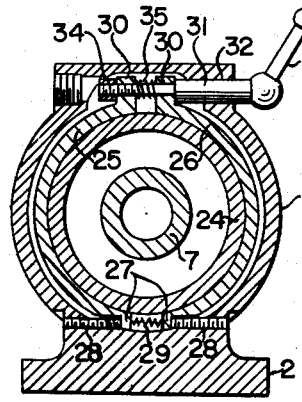
Figure 5:
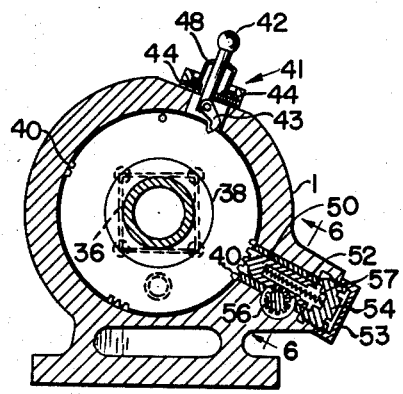
Figure 7:
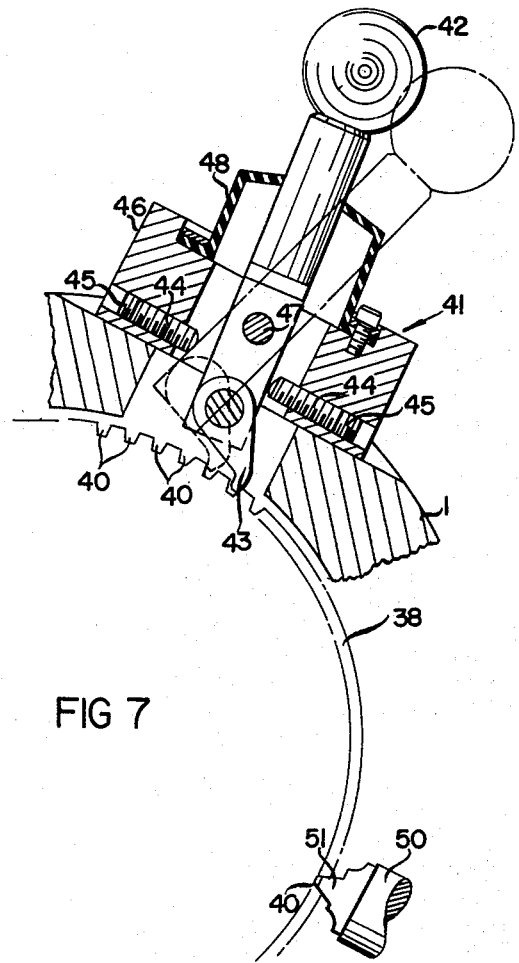
Figure 8:
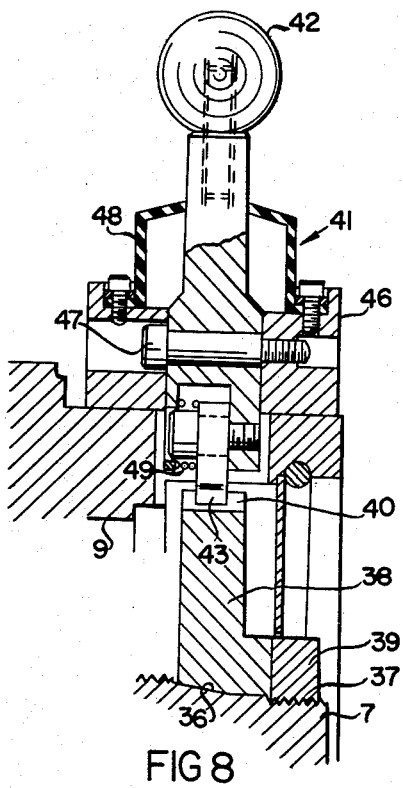

FIGS. 4 and 5 are vertical cross-section views taken respectively along the lines 4—4 and 5—5, FIG. 3;

FIG. 6 is a cross-section view of the indexing pin actuating mechanism, such section having been taken substantially along the line 6—6, FIG. 5;

FIG. 7 is a fragmentary vertical cross-section view similar to FIG. 5 except on larger scale; and FIG. 8 is a radial cross-section view taken substantially along the line 8—8, FIG. 7.

Figure 1:
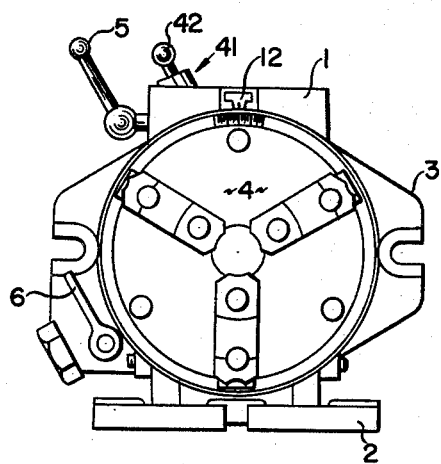
FIG. 1 is an end elevation view of a preferred form of indexing device according to this invention; such view being from the chuck end thereof.
Figure 2:
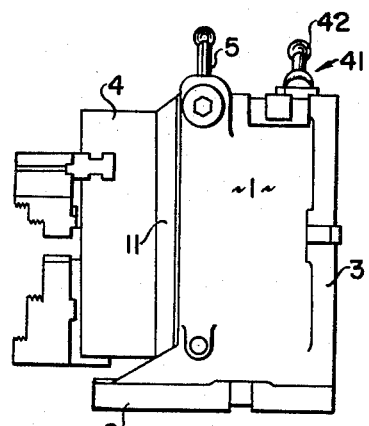
FIG. 2 is a side elevation view of the present indexing device as viewed from the right-hand side of FIG. 1.

As best shown in FIGS. 1 and 2, the indexing device herein comprises a housing 1 which is formed with perpendicularly related mounting flanges 2 and 3 by which the housing may be mounted either in horizontal position as shown in the drawings, or in vertical position.

Adjacent one end of said housing 1 is a chuck 4 herein shown as being a self-centering, three-jaw chuck which is adapted to hold a workpiece for angular indexing about the axis of the housing 1 and chuck 4.

As will be described in detail later, the turning of the handles 5 and 6 respectively releases a brake and withdraws an indexing pin so that the chuck 4 may be rotated from one indexed position to the next, the indexing pin preferably being spring-actuated so as to drop into the next notch of an index plate, whereupon the handle 5 may be turned to set the brake and thereby hold the chuck 4 in its newly indexed position without imposing torque loads on the indexing pin.

Referring now in detail to the internal construction of the indexing device, reference is made to FIGS. 3–6, the chuck 4 having been omitted in FIG. 3, since the particular form of the chuck and its mounting does not constitute any part of this invention except to the extent that the indexing spindle 7 may be provided with a locating boss 8 or the equivalent which assures that the chuck and spindle axes will be coaxial.

The housing 1 is formed with a bore 9 therethrough in which the outer races 10 of a pair of axially spaced-apart and oppositely disposed tapered roller bearings are fixedly supported. The indexing spindle 7 is preferably tubular, as shown, to accommodate elongated workpieces in the form of bar stock, for example, and said spindle is provided with a flange 11 at one end to which the chuck 4 is adapted to be mounted.

The beveled outer edge of said flange 11 is graduated in degrees for cooperation with a pointer 12 mounted on the correspondingly beveled surface of the housing 1, the pointer 12 and flange 11 graduations being flush and in the normal line of sight of the operator to facilitate accurate setting of angles other than those provided by a preformed index plate.

The inner races 14 of the tapered roller bearings are preferably a snug or push fit on the spindle 7 and adjustable screw means are provided to axially draw said inner races toward each other whereby all lateral play of the spindle 7 with reference to the housing 1 is eliminated.

Said screw means is here shown as comprising a nut 15 which is threaded onto the spindle 7 and which presses a ring 16 against the end of the adjacent inner race 14, the other inner race 14 being disposed against the inner face of flange 11.

A lock ring 17 has an inner portion engaged in a keyway 18 formed on the spindle 7 and is formed with a bendable lug 19 which is adapted to be bent to engage in one of a plurality of slots in nut 15 to hold the latter against rotation in either direction. Should any looseness develop in the bearings, it is a simple matter to straighten out the lug or lugs 19 and tighten the nut 15 to eliminate such looseness, whereupon the lug or lugs 19 may be rebent.

Spanning the gap between the housing 1 and the pressure ring 16 is a sealing ring 20 which retains lubricant in the bearings and also prevents ingress of foreign matter thereinto. The other end of the bearing chamber is sealed by means of a dished spring washer 21 (as of spun brass) which, when installed, is partly flattened in the axial direction so as to yieldably engage the housing 1 to thus provide a seal against ingress of foreign matter into the bearing chamber.

Press fitted or otherwise permanently mounted on an inwardly extending boss 23 of the spindle flange 11 is a brake drum 24 which has a cylindrical outer surface adapted to be frictionally engaged by the inner cylindrical surfaces of a pair of brake shoes 25 and 26.

The brake shoes 25 and 26, as best shown in FIG. 4, are each formed with a step 27 at its lower end against which an adjustable screw 28 abuts. A spring 29 is compressed between the lower ends of said shoes 25 and 26 to maintain contact of the steps 27 with the ends of the respective screws 28. Normally, the screws 28 will be turned inwardly so that the inside cylindrical surfaces adjacent the lower ends of the brake shoes 25 and 26 are just about touching the brake drum 24.

The upper ends of said shoes 25 and 26 are formed with ears 30 through which the reduced end portion of a shaft 31 loosely extends, the shaft 31 being rotatably supported in a cross-bore 32 of the housing 1 and being provided with a suitable operating handle 5.

The one brake shoe 25 has keyed thereto a nut 34 in which the threaded end of said shaft 31 is engaged whereby when said shaft is turned in one direction, the brake shoes 25 and 26 are drawn together to thus grip the brake drum 24 therebetween to prevent rotation of the spindle 7. When the shaft 31 is turned in the opposite direction, the brake shoes 25 and 26 are separated under the influence of the spring 35 therebetween. The brake mechanism just described is, as can be seen, of the floating type whereby it has no tendency to laterally or axially shift the spindle 7.

The end of the indexing spindle which is opposite to the flange 11 thereof is formed with a tapered polygonal portion 36, herein a tapered square, which terminates in a threaded portion 37. The index plate 38 is formed with a complementary tapered square opening therethrough and is adapted to be tightly wedged on the spindle 7 by means of the nut 39 which is threaded on said spindle and which forces the index plate toward the right as viewed in FIG. 3. Accordingly, there can be no lateral or angular play between the index plate 38 and the spindle 7.

Said index plate 38 is formed with a plurality of peripheral notches 40, the opposite sides of which converge inwardly at an included angle of 45°, for example. It can be seen that when the index plate 38, of say, 5″ diameter, has a large number of notches 40 (for example, 67, 97, etc.) for use in the milling of a gear blank, the teeth of said index plate 38 will be quite narrow and weak. Thus, the sides of the notches 40 are sloped at a relatively large included angle as aforesaid to avoid reliance on wedging, and consequent bending of the teeth, in securing accurate indexing of the index plate 38. Instead of such wedging, the present invention utilizes a ratchet mechanism 41 which comprises an oscillatable handle 42 provided with a pawl 43 arranged to click over a tooth of the index plate 38 from one notch 40 to the next when the handle 42 is swung in one direction and to engage one side of a tooth of such next notch to advance the index plate 38 when the handle 42 is swung in the opposite direction. The ratchet mechanism 41 has adjusting screws 44, locked by set screws 45, to limit the stroke of the handle 42 so that the pawl 43 will click over a tooth as aforesaid and advance the index plate 38 an amount exactly equal to the angular pitch of the notches 40.

In detail, the ratchet mechanism 41 comprises a block 46 secured to the housing 1, the handle 42 being pivotally mounted on the shoulder screw 47 secured in said block. A flexible boot 48 is secured to the block 46 and embraces the shank of the handle 42 to permit pivotal movement about the shoulder screw 47 but prevents entrance of foreign matter into the housing 1. The block 46 is preferably formed with a rectangular opening as shown, between one pair of parallel sides of which the rectangular cross-section portion of the handle 42 is guided for swinging movement in a plane normal to the axis of the spindle 7 and index plate 38.

The inner end of handle 42 pivotally mounts the ratchet pawl 43 which, through the torsion spring 49, having its ends fixed with respect to the handle 42 and pawl 43 respectively, constantly tends to turn the ratchet pawl 43 in a clockwise direction as viewed in FIG. 7 with its right-hand leading end in engagement in one of the interdental spaces or notches 40 of the index plate 38. Thus, when it is desired to index the index plate 38, one tooth at a time, the handle 42 will be swung clockwise to the dot-dash position shown in FIG. 7, whereupon the ratchet pawl 43 will click over one tooth of the index plate 38, such clockwise movement of the handle being stopped by the end of the left adjusting screw 44. Now, when the handle is swung in a counterclockwise direction to the full line position of FIG. 7 with the side of handle 42 in abutting engagement with the right-hand adjusting screw 44, the index plate 38 will have been rotated to position a notch 40 opposite the index pin 50 in exact alignment with the tapered inner end 51 of said index pin owing to precise adjustment of the right-hand adjusting screw 44.

The index pin 50 is axially slidable in a tubular bushing 52 which is exteriorly tapered as shown and which is fitted into a radially disposed tapered bore in the housing 1. Thus, should looseness develop between the index pin 50 and the bushing 52, all that it is necessary to do is to remove the cap 53 and tighten the adjusting screw 54.

It has been found that, even though the bushing 52 is in the form of an unslotted bronze tube of about ¼″ wall thickness, the bore therein may be reduced in diameter as much as several thousandths of an inch, if necessary. Accordingly, periodically said screw 54 may be screwed in slightly to take up any wear of the index pin 50 or of the bore in the bushing 52. With lateral play thus eliminated, there cannot be any angular looseness of the index plate 38 when in an indexed position when the tapered inner end 51 of the index pin 50 is engaged in one of the complementary notches 40.

Moreover, as previously described, the brake mechanism (drum 24 and shoes 25—26) securely locks the spindle 7 so that none of the torque load on the spindle 7 will be transferred back to the index pin 50. It is, of course, to be understood that the brake may be used to lock the spindle 7 in any desired angular position irrespective of whether or not a notch 40 of the index plate 38 registers with the inner end 51 of the index pin 50.

The mechanism for withdrawing the index pin 50 out of engagement with the index plate 38 is here shown as comprising a shaft 55 provided with the handle 6 at one end and with a gear 56 at the other end in mesh with the gear rack formed on the side of the index pin 50.

Thus, when the shaft 55 is rotated by handle 6, the index pin 50 is moved radially outward, and when the handle 6 is released, the spring 57 compressed between the index pin 50 and the screw 54 forces the index pin 50 radially inward to engage in the next notch 40 as the spindle 7 is rotated. Should it be desired to hold the index pin 50 in the retracted or withdrawn position, the shaft 55 is pushed inwardly, whereupon the end of the screw 58 engages in an axially extending slot 59 in the shaft 55.

Thus, the shaft 55 is prevented from being rotated under the influence of the spring 57 tending to move the index pin 50 inwardly. The end of said screw 58 fits in a peripheral groove 60 of the shaft 55 to hold said shaft from axial movement while rotated except in this one position wherein the groove 60 is intersected by the axial slot 59.

By reason of the provision of a tapered inner end 51 on said index pin 50 which clears the bottoms of notches 40, there is no clearance at the sides, and thus no rotary play to affect the accuracy even if the notches 40 or the end 51 of the index pin 50 wear. Moreover, even a relatively weak spring 57 acting on the index pin 50 will move the index pin so as to to be properly seated in the interdental space 40 of the index plate 38 so as to provide for very accurate indexing without imposition of bending or shear loads on the teeth of index plate 38 and on the inner end 51 of the index pin 50. With the index plate 38 thus turned the precise desired amount by the ratchet mechanism 41, the brake lever 5 will be turned as previously described, to securely lock the indexing device in the indexed position, whereby spindle loads will not be transmitted to the index pin 50. Once the precise adjustments of the screws 44 have been made, indexing movement of the index plate 38 will be exactly one tooth, so that the index pin 50 will pop into the interdental space 40 in alignment therewith without necessity of imposing bending or shear loads on the teeth and on the relatively narrow tapered inner end 51 of the index pin 50.

Moreover, it is a simple matter to substitute one index plate 38 for another and to make the necessary adjustments of the screws 44 to position the notches 40 of the index plate 38 in exact alignment with the tapered inner end portion 51 of the index pin 50.

Summarizing, it can be seen that the present indexing device is easy to be set, by reason of the provision of graduations which are on beveled surfaces which are in the normal line of sight of the operator; that the spindle-housing bearing mechanism is protected not only by the oil seal 20 but also by the dished spring washer 21 which has the additional function of creating a slight drag on the rotary indexing movement which has been found to be desirable; that a floating brake mechanism 24, 25, 26 has been provided so as not to tend to disturb the co-axial location of the spindle 7 and housing 1 axes; that the provision of oppositely disposed tapered roller bearings with the take-up means ensures playless rotatable mounting of the spindle 7; that the interengaging tapered polygonal surfaces of the index plate 38 and spindle 7 ensures a playless connection; that the adjustable ratchet mechanism 41 enables precise indexing movement of index plate 38 so that the index pin 50 moves into engagement with said plate without imposing bending or shear loads while holding the plate, without play, until the brake is set; and that the take-up on the tapered bushing 52 ensures playless slidable mounting of the index pin 50.

Accordingly, the present indexing device is foolproof and has an indefinite life, since the wear of any parts thereof which have anything to do with the indexing function may be adjusted to compensate for wear or else the wear of parts is automatically compensated for.

Other modes of applying the principle of the invention may be employed, change being made as regards the details described, provided the features stated in any of the following claims, or the equivalent of such, be employed.

I therefore particularly point out and distinctly claim as my invention:

1. An indexing device comprising a housing; an indexing spindle journalled in said housing for rotation relative to said housing; a peripherally toothed index plate non-rotatably mounted on said spindle; an index pin, means for movably mounting said index pin on said housing for movement into engagement in an interdental space of said plate to position said spindle in a selected rotary position; brake means in said housing adapted to engage said spindle to lock the same in such selected rotary position and thereby relieve said index pin of torque loads imposed on said spindle; means mounted on said housing for moving said brake means into and out of frictional engagement with said spindle; an adjustable ratchet mechanism in said housing having a spring loaded ratchet pawl engageable with a tooth of said index plate, and means operative to limit movement of said ratchet mechanism to rotate said plate and spindle through an angle equal to the circular pitch of the teeth of said plate, whereby to position an interdental space of said plate for engagement by said index pin as aforesaid.

2. The indexing device of claim 1 wherein said ratchet mechanism comprises a handle pivotally connected to said housing between its ends for oscillation about an axis parallel to the axis of said spindle and carrying said ratchet pawl at its radially inner end, and said means to limit movement of said ratchet mechanism comprises adjusting screw means having screw-threaded engagement with said housing and adapted to be engaged by said handle to constitute a stop for the angle of turning of said index plate and spindle by said pawl.

3. The indexing device of claim 2 wherein said screw means comprises two screws respectively operative to engage said handle upon turning in opposite directions, and set screw means operative to lock said two screws in selected positions of adjustment.

4. The indexing device of claim 2 wherein said handle extends from said housing through a flexible boot.

References Cited in the file of this patent
UNITED STATES PATENTS

| | | |
|---|---|---|
| 300,283 | Rowlands | June 10, 1884 |
| 571,402 | Schneider | Nov. 17, 1896 |
| 1,003,333 | Campbell | Sept. 12, 1911 |
| 1,406,339 | Browand | Feb. 14, 1922 |
| 2,355,246 | Shields | Aug. 8, 1944 |
| 2,380,314 | Kaule | July 10, 1945 |
| 2,871,732 | Olson | Feb. 3, 1959 |
| 2,902,889 | Trechsel | Sept. 8, 1959 |
| 2,953,042 | Condon | Sept. 20, 1960 |

FOREIGN PATENTS

| | | |
|---|---|---|
| 8,687 | France | Jan. 11, 1837 |
| 217,796 | Germany | Jan. 14, 1910 |